S. L. ARNOLD.
BED BOTTOM.
APPLICATION FILED JULY 26, 1921.
1,423,065.
Patented July 18, 1922.
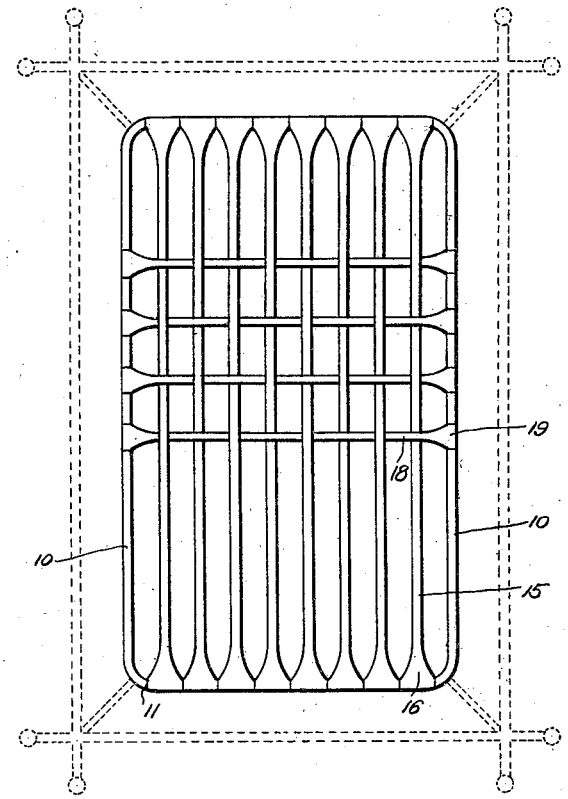
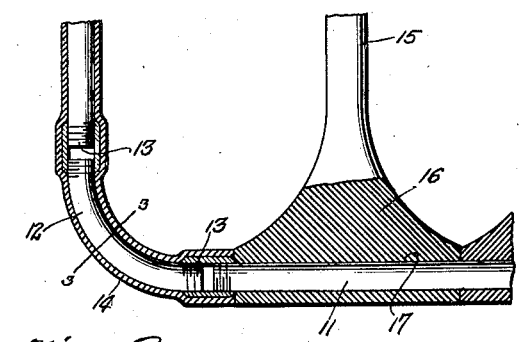
Sherman L. Arnold
INVENTOR.
BY A. B. Forth,
ATTORNEY.

UNITED STATES PATENT OFFICE.

SHERMAN L. ARNOLD, OF WOODLAWN, PENNSYLVANIA.

BED BOTTOM.

1,423,065. Specification of Letters Patent. Patented July 18, 1922.

Application filed July 26, 1921. Serial No. 487,651.

*To all whom it may concern:*

Be it known that I, SHERMAN L. ARNOLD, a citizen of the United States, residing at Woodlawn, in the county of Beaver and State of Pennsylvania, have invented certain new and useful Improvements in Bed Bottoms, of which the following is a specification.

The present invention relates to an improved bed-bottom. The invention has for its object to provide a bed-bottom which will be strong and durable, completely sanitary, and which will have no sharp points or projections and no rough places to which the bed clothing, mattress covering or the like could become attached and consequently become torn during the arranging of the bedding.

The annexed drawing shows a device within the scope of the invention, Fig. 1 being a plan view of the improved bed-bottom, the frame-work of the bed and the brackets or other means for supporting the bottom being shown in dotted lines. Fig. 2 shows the preferred manner of assembling the parts of which the bed-bottom is constructed. Fig. 3 shows a section, for example on the line 3—3 of Fig. 2.

The frame-work of the bed-bottom is composed preferably of iron or other metal pipe having longitudinal rails 10 and cross-rails at the head and foot 11. These are preferably assembled by means of the curved corner-pieces 12, by means of the pipe couplings 13. The frame may if desired be made of ordinary one-inch iron pipe, which is preferably provided with a covering 14, of rubber composition, such as vulcanized rubber mixed with suitable filler materials.

The longitudinal members between the rails 10, and parallel thereto, are preferably composed of rubber hose or the like 15, and any desired number of pieces of this material may be employed (eight of such pieces being shown in Fig. 1.) The rubber hose is preferably of the ordinary construction made by winding alternate layers of strong textile fabric and sheet rubber and having a layer of sheet rubber on the outside. At the ends of the elements 15 are enlargements 16, these preferably being cast and being provided (at the time of casting preferably) with holes 17, of a size capable of readily being slipped on or off the pipe 11. Suitable fabric or other textile reinforcing material is embedded in the ends 16, at the time of making the same.

To prevent sagging of the bed-bottom, it is advisable to provide a suitable number of cross-wise pieces 18, which are preferably made in the same manner as the pieces 15 (except being shorter) and these likewise are preferably provided with ends 19 similar to the ends 16, these having holes therein for the reception of the pipes 10.

A bed-bottom prepared in this manner becomes substantially indestructible and will, with reasonable care, wear for many years. It is understood that any ordinary mattress will be placed upon the bed-bottom in the usual manner.

Should one of the elements 15 (or 18) become broken, through misuse, or should the same become worn out after long-continued use, by removing the proper couplings 13, the broken element may be taken out and a new one substituted therefor, after which the coupling 13 will be replaced. For convenience in this operation, all of the couplings 13 may be made with a right-hand thread at one end and a left-hand thread at the other end. It is understood that any other convenient form of assembling can be employed in place of the curved pipe 12 and the couplings 13. Without restricting myself unduly, I desire to state that ordinary ¾-inch rubber hose may be employed as the material of which the main portion of each of the elements 15 and 18 are composed.

An added feature of considerable importance is the fact that there are no crevices in which vermin can collect. Also, there being no metal in contact with the mattress or bed clothing, there is no danger of soiling of the mattress or bed clothing by rust. The resiliency of the rubber hose furnishes the necessary amount of spring, so that additional bed springs are unnecessary.

I claim:

1. A bed-bottom comprising a rigid tubular metal frame, a plurality of supporting elements extending lengthwise thereof, such supporting elements being formed of rubber reinforced with textile material, the ends of such supporting elements being composed of rubber reinforced with textile material, and having apertures therein through which the end of said frame can be passed, and additional supporting elements extending crosswise of said metal frame, at the portion thereof where the greatest strain comes during normal use of the bed-bottom.

2. A bed-bottom comprising a rigid tubular metal frame, a plurality of supporting elements extending lengthwise thereof, such supporting elements being formed of rubber and fabric hose, the ends of such supporting elements being composed of rubber reinforced with textile material, and having apertures therein through which the end of said frame can be passed, and additional supporting elements of like construction extending crosswise of said metal frame, at the portion thereof where the greatest strain comes during normal use of the bed-bottom and threaded tubular couplings for the elements of the frame, near the corners thereof.

3. A bed-bottom comprising a rigid metal frame formed of metal pipe, having a covering of rubber composition, a plurality of supporting elements extending lengthwise thereof, such supporting elements being formed of rubber and fabric hose, the ends of such supporting elements being composed of rubber reinforced with textile material, and having apertures in said ends through which the end of said frame can be passed, and additional supporting elements extending crosswise of said metal frame, at the portion thereof where the greatest strain comes, during normal use of the bed-bottom, said frame being provided with tubular couplings near the corners for readily taking apart, all such elements being free from projections upon which the bed clothing could become entangled, and free from projecting points.

In testimony whereof I affix my signature.

SHERMAN L. ARNOLD.